(12) United States Patent
Sauchyn (10) Patent No.: US 10,938,274 B2
(45) Date of Patent: Mar. 2, 2021

(54) DEVICES AND METHODS FOR FLUID MASS POWER GENERATION SYSTEMS

(71) Applicant: Robert David Sauchyn, Regina (CA)

(72) Inventor: Robert David Sauchyn, Regina (CA)

( * ) Notice: Subject to any disclaimer, the term of this patent is extended or adjusted under 35 U.S.C. 154(b) by 150 days.

(21) Appl. No.: 16/263,299

(22) Filed: Jan. 31, 2019

(65) Prior Publication Data

US 2020/0251960 A1    Aug. 6, 2020

(51) Int. Cl.
| | | |
|---|---|---|
| *H02K 7/18* | (2006.01) | |
| *F03B 3/12* | (2006.01) | |
| *F03D 1/06* | (2006.01) | |
| *H02K 11/04* | (2016.01) | |

(52) U.S. Cl.
CPC ........... *H02K 7/1823* (2013.01); *F03B 3/126* (2013.01); *F03D 1/0633* (2013.01); *H02K 11/046* (2013.01)

(58) Field of Classification Search
CPC ..... H02K 7/1823; H02K 11/046; F03B 3/126; F03D 1/0633
See application file for complete search history.

(56) References Cited

U.S. PATENT DOCUMENTS

| | | | | |
|---|---|---|---|---|
| 4,079,264 A * | 3/1978 | Cohen | ...................... | F03D 1/04 |
| | | | | 290/55 |
| 4,220,870 A * | 9/1980 | Kelly | ..................... | F03D 13/20 |
| | | | | 290/44 |
| 5,642,984 A * | 7/1997 | Gorlov | ...................... | F03B 3/00 |
| | | | | 416/176 |
| 5,760,515 A * | 6/1998 | Burns | ....................... | F03D 9/00 |
| | | | | 310/115 |
| 6,172,429 B1 * | 1/2001 | Russell | .................... | F03D 9/008 |
| | | | | 290/54 |
| 6,882,059 B1 * | 4/2005 | DePaoli | ................ | B60K 16/00 |
| | | | | 290/44 |
| 7,362,004 B2 * | 4/2008 | Becker | ...................... | F03D 3/02 |
| | | | | 290/55 |
| 7,528,498 B2 * | 5/2009 | Yeh | .......................... | F03D 1/02 |
| | | | | 290/55 |
| 7,652,388 B2 * | 1/2010 | Lyatkher | ................ | F03B 13/20 |
| | | | | 290/53 |

(Continued)

FOREIGN PATENT DOCUMENTS

| | | |
|---|---|---|
| GB | 2476126 A | 6/2011 |
| WO | 03087571 A2 | 10/2003 |

(Continued)

OTHER PUBLICATIONS

Website https://waterlilyturbine.com/, front page downloaded on Jan. 31, 2019.

(Continued)

*Primary Examiner* — Tulsidas C Patel
*Assistant Examiner* — Joseph Ortega
(74) *Attorney, Agent, or Firm* — Young Law Firm, P.C.

(57) ABSTRACT

A fluid mass movement electrical energy generation device and system may comprise a modular and scalable array of stationary tube-shaped modules containing small rotating turbines. Tube-shaped modules may be easily installed by anyone, almost anywhere fluid mass flow is present (including many locations not suited to conventional wind turbines) and may efficiently, safely and quietly capture energy from turbulent and inconsistent fluid flow patterns.

25 Claims, 4 Drawing Sheets

(56) References Cited

U.S. PATENT DOCUMENTS

| | | | | |
|---|---|---|---|---|
| 8,063,503 B2* | 11/2011 | Bahari | F03D 1/02 | 290/55 |
| 8,096,750 B2* | 1/2012 | McEntee | F03B 3/121 | 415/4.2 |
| 8,393,853 B2* | 3/2013 | Sauer | F03B 13/264 | 415/72 |
| 8,419,346 B2* | 4/2013 | Attey | F03D 3/002 | 415/4.2 |
| 8,981,585 B2* | 3/2015 | Soong | F03B 13/10 | 290/54 |
| 9,752,555 B2* | 9/2017 | Gdovic | F03D 3/005 | |
| 9,909,555 B2* | 3/2018 | Calderone | F03B 17/061 | |
| 9,982,674 B2* | 5/2018 | Kreidler | F04D 25/082 | |
| 10,539,147 B2* | 1/2020 | Sarlioglu | F04D 29/324 | |
| 2003/0231468 A1* | 12/2003 | Lopatinsky | F04D 17/04 | 361/697 |
| 2006/0233635 A1* | 10/2006 | Selsam | F03D 1/065 | 415/4.3 |
| 2006/0257240 A1* | 11/2006 | Naskali | F03D 3/061 | 415/4.4 |
| 2007/0029807 A1* | 2/2007 | Kass | F03D 3/065 | 290/55 |
| 2007/0296219 A1* | 12/2007 | Nica | F03D 3/0409 | 290/55 |
| 2008/0088200 A1* | 4/2008 | Ritchey | H02K 16/00 | 310/268 |
| 2008/0148549 A1 | 6/2008 | Fein et al. | | |
| 2008/0150286 A1* | 6/2008 | Fein | F03D 9/46 | 290/44 |
| 2008/0315592 A1* | 12/2008 | Branco | F03D 13/20 | 290/55 |
| 2009/0001731 A1* | 1/2009 | Perlo | F03D 1/02 | 290/55 |
| 2009/0110554 A1* | 4/2009 | Dukovic | F03D 3/002 | 416/41 |
| 2009/0146435 A1* | 6/2009 | Freda | F03D 9/11 | 290/55 |
| 2009/0191057 A1* | 7/2009 | Knutson | F03D 3/0481 | 416/23 |
| 2009/0284018 A1* | 11/2009 | Ellis | F03D 3/005 | 290/55 |
| 2010/0001532 A1 | 1/2010 | Grumazescu | | |
| 2011/0025057 A1* | 2/2011 | Agtuca | H02K 3/24 | 290/43 |
| 2011/0148116 A1* | 6/2011 | Halstead | F03D 3/005 | 290/52 |
| 2011/0187114 A1* | 8/2011 | Socolove | F03D 9/34 | 290/55 |
| 2011/0206526 A1* | 8/2011 | Roberts | F03D 3/02 | 416/223 R |
| 2011/0254276 A1* | 10/2011 | Anderson, Jr. | F03B 17/061 | 290/54 |
| 2012/0114501 A1 | 5/2012 | Rutherford | | |
| 2013/0049512 A1* | 2/2013 | Jung | H02K 21/24 | 310/156.36 |
| 2013/0069372 A1* | 3/2013 | Ferguson | H02K 7/1823 | 290/54 |
| 2013/0334823 A1* | 12/2013 | Hopper | F03B 13/264 | 290/54 |
| 2013/0334824 A1* | 12/2013 | Freda | F03D 80/70 | 290/55 |
| 2014/0083091 A1* | 3/2014 | Piskorz | F03D 9/28 | 60/398 |
| 2014/0284932 A1* | 9/2014 | Sharkh | F03B 13/105 | 290/54 |
| 2015/0069759 A1* | 3/2015 | Aranovich | F03D 3/04 | 290/52 |
| 2015/0159619 A1* | 6/2015 | Manshanden | F04D 3/02 | 415/8 |
| 2015/0345260 A1* | 12/2015 | Green | E21B 41/0085 | 310/68 R |
| 2016/0201283 A1* | 7/2016 | Fjalling | F04D 3/02 | 405/82 |
| 2016/0377053 A1* | 12/2016 | Reyna | F03D 3/005 | 415/210.1 |
| 2017/0117783 A1* | 4/2017 | Huang | F03D 9/25 | |
| 2017/0274992 A1* | 9/2017 | Chretien | B64C 27/14 | |
| 2017/0328205 A1* | 11/2017 | Gillengerten | F01D 5/03 | |
| 2018/0045165 A1* | 2/2018 | White | F03B 3/04 | |
| 2018/0135599 A1* | 5/2018 | Baxter, Jr. | F03D 3/0418 | |
| 2018/0171981 A1* | 6/2018 | Bergstrom | F03D 9/25 | |
| 2018/0269823 A1* | 9/2018 | Borba | F03D 9/25 | |
| 2019/0277249 A1* | 9/2019 | Aranovich | F03D 15/20 | |
| 2019/0301473 A1* | 10/2019 | Kato | F04D 19/007 | |
| 2019/0323523 A1* | 10/2019 | Chang | F04D 29/668 | |

FOREIGN PATENT DOCUMENTS

| | | |
|---|---|---|
| WO | 2004068606 A1 | 8/2004 |
| WO | 2013165413 A2 | 11/2013 |

OTHER PUBLICATIONS

International Search Report and Written Opinion in PCT/US2020/012902 dated Feb. 18, 2020.

\* cited by examiner

DEVICES AND METHODS FOR FLUID MASS POWER GENERATION SYSTEMS

BACKGROUND

Embodiments relate to power generation devices and methods. More particularly, embodiments relate to electric power generation systems using fluid mass movement (typically air or water) as the principal energy source.

DETAILED DESCRIPTION

Embodiments are drawn to electric power generation devices and methods that are used for converting kinetic energy available in moving masses of fluid (such as wind or flowing water) to electrical energy for storage or consumption.

One embodiment is a modular, scalable fluid mass movement energy harvesting device in system form to widen fluid energy electrical generation availability, flexibility and accessibility. According to embodiments, the device may obviate the complexities of conventional wind turbines while delivering comparable power per unit area and do so safely and silently. Embodiments are operable even in very low or turbulent winds or in environments exhibiting low fluid mass flow. At structural scale, the device in system form does not move, according to one embodiment. Therefore, individual tube-shaped modules may be shipped separately and easily mounted into system form by anyone, anywhere fluid mass flow is present, including near buildings and near the ground. The device, according to one embodiment, may comprise at least one tube-shaped module and its support. The number of tube-shaped power generation modules per system is fully configurable by the user according to the power generation of the application at hand. Embodiments may make use of simple support structures (vertical posts, poles, studs, existing structures, trees, etc.) without requiring a concrete footing. As embodiments are configured to generate DC power, they are compatible and may be used in conjunction with existing solar power systems and installations.

Reference will now be made in detail to the construction and function of embodiments illustrated in the accompanying drawings. The following description is only exemplary of the embodiments described and shown herein. The embodiments, therefore, are not limited to these implementations, but may be realized by other implementation embodiments. The embodiments described, shown and claimed herein include devices that may comprise a single tube-shaped fluid mass movement turbine or a scalable array of small, modular, miniature, or sub-miniature tube-shaped fluid mass movement turbines that are configured to generate electric power for storage or consumption.

According to one embodiment, one or more tube-shaped power generation modules, as described herein, may be configured to efficiently capture and convert low to high speed fluid mass movement into electrical power. Aggregating many small tube-shaped turbines according to embodiments to form a larger array may present several advantages over conventional turbines. Indeed, embodiments can be installed almost anywhere fluid flow exists, including many locations that are inherently not suited to conventional wind turbines. Such locations may include, for instance, urban and residential environments, near structures, close to the ground, and in areas where it is desirable to block wind and recapture some of its energy, or otherwise create a stationary barrier. According to one embodiment, the present tube-shaped power generation modules may be oriented horizontally or vertically or in any orientation therebetween, and may take advantage of fluid current flow patterns, wind shears or other turbulent and chaotic wind flow generated by physical structures, such as a building, roadway sign or other structure that diverts fluid flow around it. The low rotational inertia of the constituent individual miniature tube-shaped turbine devices obviates safety concerns, danger to wildlife, noise and the obtrusive nature of larger turbines, while enabling very low starting wind speed (also known as the "cut-in" speed). Moreover, embodiments described and shown herein may more efficiently capture energy from turbulent and inconsistent fluid flow patterns, as is typical of wind near the ground and structures. One advantage of low cut-in wind speed inherent in the present turbine design is that fluid mass movement from any direction relative to the turbine being may be readily captured and converted to electric energy, even when the direction of the wind reverses or shifts. Transportation and installation of individual tube-shaped turbine modules is dramatically simplified, as simple static support structures of varying design and geometry may be easily built onsite with minimal expertise and tools. This enables a "do-it-yourself" approach that is further enhanced by a simple design, ease of scaling an array (to generate more power) over time and ease of maintenance, according to embodiments.

Figure 1:
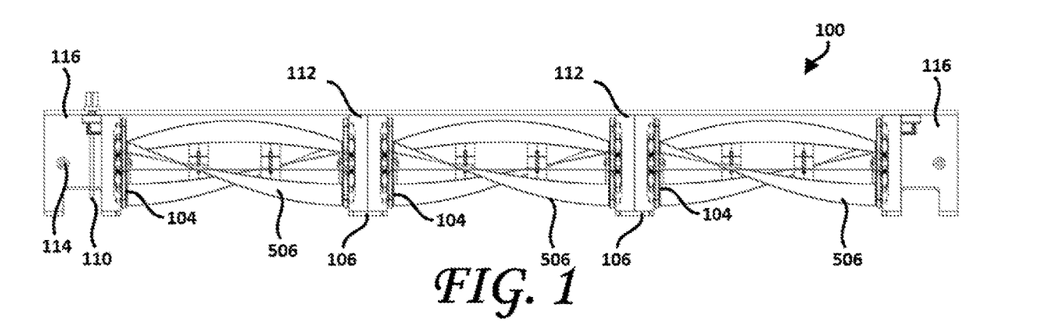
FIG. 1 is a front wireframe view of a single power generation module device according to one embodiment.
Figure 2:
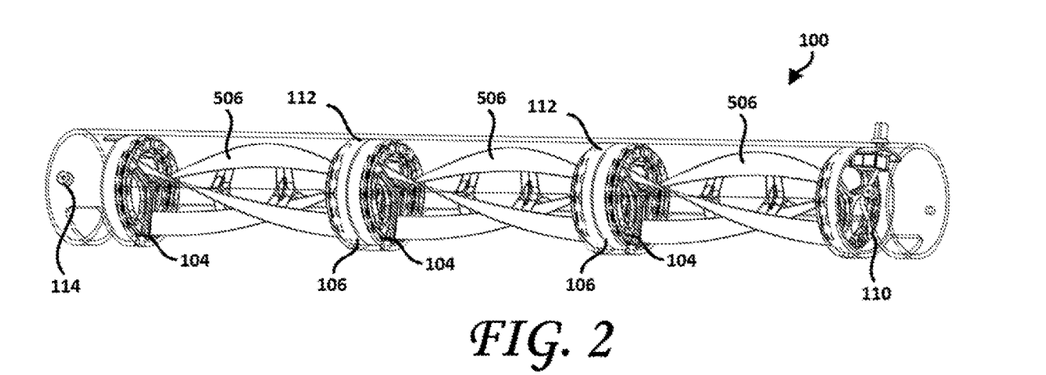
FIG. 2 is a perspective wireframe view of the single power generation module device of FIG. 1.

As shown, FIGS. 1 and 2 are wire-frame diagrams that show a single tube-shaped turbine module 100 that converts a portion of the kinetic energy of moving masses of fluid (e.g., air or water) to electric energy. According to an embodiment, the turbine module 100 may include a stationary outer housing tube 102 (although shown in both FIGS. 1 and 2, the housing tube 102 is best shown in the wireframe diagram of FIG. 3), one or more rotors 104, generator stator/bearing supports 106, electrical connector(s) 110, internal junction box(es) 112, mounting feature(s) 114 and end cap(s) 116. The tube-shaped turbine module 100 may be deployed as a single, standalone unit or in combination with others in a larger array, as discussed below. The tube-shaped turbine module 100 may be portable or rigidly attached to a support structure and may be configured in any orientation, such as a HAWT (horizontal axis wind turbine) or a VAWT (vertical axis wind turbine) configurations, according to embodiments.

Turbine module 100 may be scaled up or down in size according to the application and may contain one or more turbine(s) 502, arranged linearly as illustrated, according to one embodiment. For example, embodiments of turbine module 100 may range, for example, from 3 to 36 inches in diameter and from 1 to 24 feet in length. It is to be understood, however, that the foregoing dimensions and any dimensions referred to herein are exemplary and not limiting in nature. Those of skill in this art will recognize that other dimensions and/or configurations may be implemented, depending upon the application, and that the elements of the device and system could be of any length or dimension, all of which are considered within the scope of this disclosure. Furthermore, any discussion of dimensions or ranges of dimensions or physical or dynamic aspects such as flow rates or ranges of motion or time factors outlined herein are exemplary in nature only and should also not be considered to be limiting.

Figure 3:
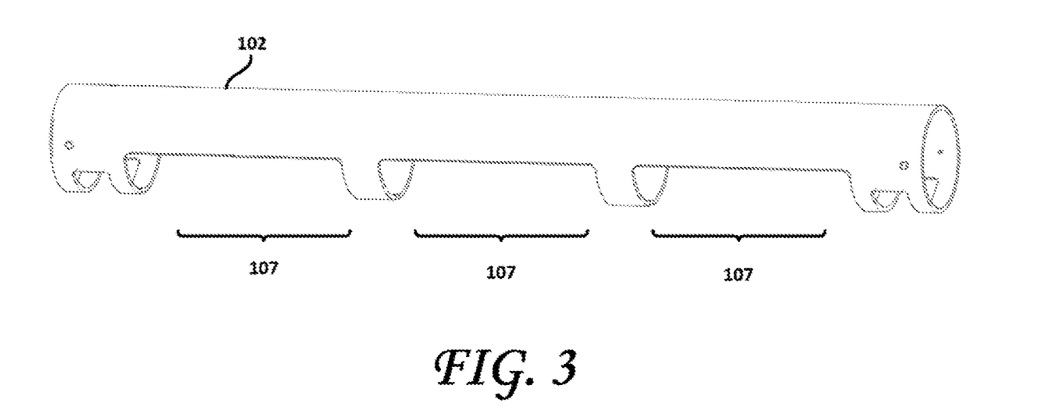
FIG. 3 is a perspective wireframe view of a stationary hollow housing tube of a power generation module device according to one embodiment.

As best shown in FIG. 3 but also shown in FIGS. 1 and 2, according to one embodiment, housing tube 102 may comprise one or more cutouts 107, cut into the housing tube 102 to optimally guide fluid flow to the turbine(s) 502 and block fluid flow from the stators/bearing supports 106. In the embodiment shown, cutouts 107 are shaped such that fluid flows through the lower half of tube-shaped turbine module 100, while the upper half serves to direct fluid into the lower half of the tube-shaped turbine module 100 above it (in an array configuration, see FIG. 4). According to an embodiment, the upper half of housing tube 102 may also serve as a roof or cover to deflect rain or snow away from the inside of housing tube 102, as well as to provide protection from the sun and other elements. Housing tube 102 may be manufactured by cutting stock tubing (for example, by machining, laser, plasma, waterjet, or any cutting technology) or by extrusion, molding or any other suitable process.

Figure 4:
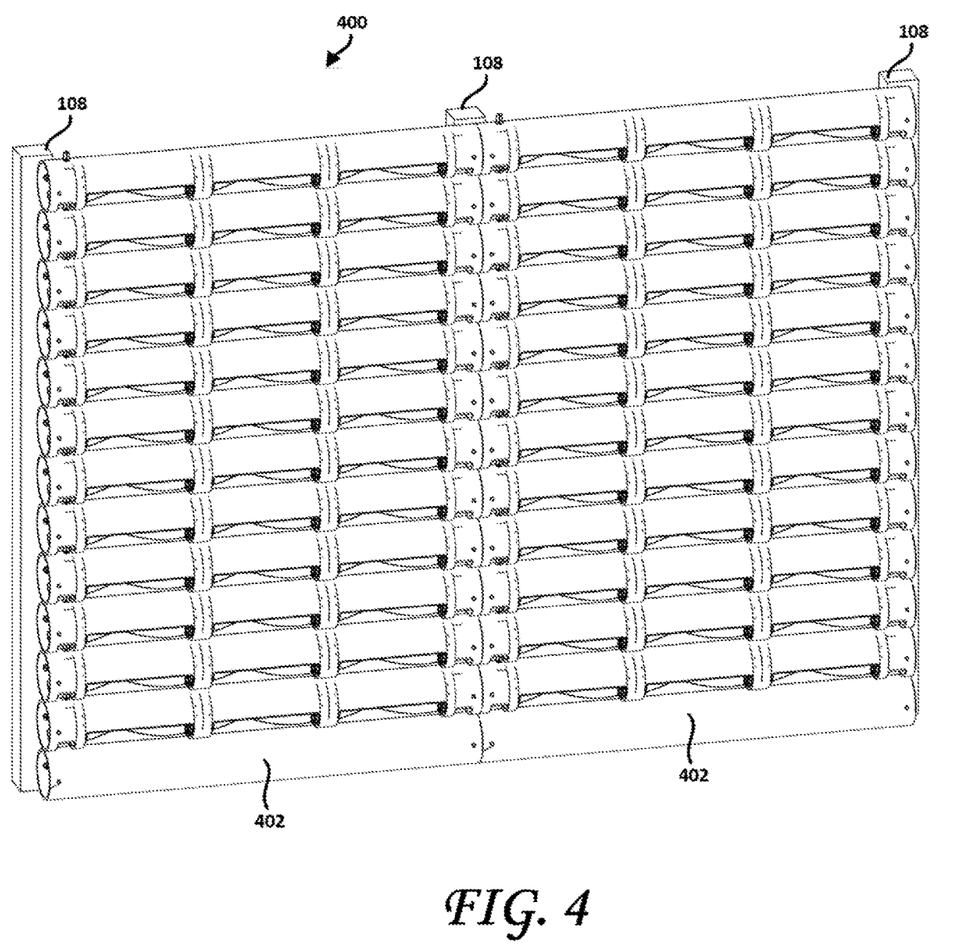
FIG. 4 is a perspective view of an array of power generation module devices, according to one embodiment.

According to embodiments, the tube-shaped turbine module 100 may include one or more mounting features 114 used to mount it to structural support members 108, shown in FIG. 4. Simple mounting holes, through which turbine module 100 can be screwed or bolted to a structural support, are illustrated. However, these mounting features 114 may be or include other structures such as, for example, mounting brackets, quick-release systems, U-channel support members, cable supports, or any other mounting system that is easily envisioned by those of skill in the art.

According to another embodiment, photovoltaic (solar power generating) material may be integrated into housing tube 102, to thereby form a hybrid wind/solar electric power generation device and system.

Electrical connector(s) 110 are used to connect the module to an electrical load (battery and/or grid-based or other electric system) and/or to adjacent turbine modules in an array of turbine modules, as shown in FIG. 4. Internal junction box(es) 112 house electrical connections between the generator stators 106 and electrical connectors 110 and, according to some embodiments, house AC to DC power rectifier(s), which may be of the diode type, transistor type or thyristor type, electrotonically-controlled, or comprise any suitable AC to DC power conversion system, as is apparent to one skilled in this art. By converting the AC power generated (by the rotation of a single turbine's rotors 104 relative to its stators 106) to DC power, the power generated by adjacent turbines in an array of turbine modules may be effectively summed electrically, without regard to the phase of rotation of the individual turbines. Additionally, by generating the same type of power as solar panels, embodiments may be more compatible with existing solar systems and power conditioning equipment, in contrast to a typical 3-phase AC small wind turbine. The random-phase nature of an array of turbine modules is further discussed below.

FIG. 4 illustrates a stationary array 400 of fluid mass movement power generation turbine modules 100, according to one embodiment. The array 400 of FIG. 4 includes two adjacent columns of twelve tube-shaped turbine modules 100, affixed to structural support members 108. Indeed, turbine modules 100 are shown in a horizontal axis (HAWT) configuration, with structural support members 108 running vertically. However, the orientation of the turbine modules 100 in space, and in turn the configuration of structural supports, is arbitrary. The illustration shown is conceptual in nature for purposes of discussion herein and is not intended as limiting the scope of the embodiments shown and described herein.

Furthermore, array 400 of turbine modules is shown as a wall or panel that amounts to an energy-harvesting pressure-gradient barrier, generating electric power from a difference in pressure between the high-pressure side of the wall and its low-pressure side. However, embodiments may comprise any geometric array of turbine modules 100 such as, for example, a linear wall, semi-circle, full-circle/perimeter, three-point star, delta/triangle, and so on and at any scale. According to another embodiment, the turbine modules may be staggered, rather than stacked vertically, forming a slanting array geometry such as could suit installation along a hillside.

The possible applications and installation scenarios are equally vast. For example, an array 400 of turbine modules may be installed near the ground (a fencing/windbreaking barrier system according to one embodiment), on rooftops, balconies or soffits of houses or buildings, spanning two existing structures, as a windbreak or shelterbelt, next to roads, as road dividers, around (and potentially supported by) other roadway infrastructure such as lights or signs, and so forth. Embodiments may also complement conventional large wind turbines and wind farms by capturing additional power near the ground and the waste residual airflow created by large turbines, while simultaneously providing a fence-like security barrier. Additionally, embodiments may augment machinery-driven generators in vehicles that normally create their own wind flow during use, such as motor vehicles, boats, ships, recreational vehicles, electric vehicles, etc., with the advantage of continuing passive power generation even when the vehicle itself is not active, in a way similar to the addition of solar panels to such vehicles. Fluid mass movement that occurs as a result of local area heating, for instance with chimney exhausts, and cooling, for instance with air conditioner exit fans, or tidal mass movement may also be converted to electrical energy, according to embodiments. Fluid mass movement energy that occurs as a result of natural convection (warm air rising and cool air falling) may also be captured and converted, according to embodiments. Simply put, embodiments may be implemented in many scenarios not suited to conventional turbines, including urban and residential environments, and may also be less obtrusive and dangerous to wildlife than conventional turbines. In many cases, these locations are in closer proximity to where the energy is actually stored or consumed, enabling true distributed, small scale power generation and correspondingly reducing the need for conventional centralized power generation and distribution systems and their inherent associated energy losses.

Similarly, although structural support members 108 are shown resembling simple fence posts, those skilled in the art can easily envision a multitude of structural support possibilities. Examples provided for illustrative purposes include posts, poles, stud-wall framing, tie-ins to existing structures or buildings, trees, cables/guy-wires, and so forth. Advantageously, because the array 400 is stationary, simple static support structures of any nature can be easily built onsite with minimal expertise and tools, in contrast to the complex support structures of conventional wind turbines for example. This enables a "do-it-yourself" approach that may be further enhanced by the inherent modularity and scalability embodied in the turbine array 400, as end-users can easily expand array 400 (and its power generation capacity) over time simply by adding additional turbine modules. Moreover, turbine modules, by virtue of their compact layout and standard sizes are easy and inexpensive to ship and transport to the installation site. The design and layout of the turbines also minimizes maintenance, further contributing to their ease of use.

In one embodiment, the array 400 of turbine modules may be configured to yaw such that it always faces the wind for optimal efficiency. This may be accomplished with hinges (e.g., a hinged gate), by securing the array to a rotating vertical shaft, or by any other means easily envisioned by those of skill in the art. Wind direction sensor(s) and electronic and/or mechanical yaw actuation may also be employed for this purpose, according to an embodiment. All of the foregoing examples are provided for illustrative purposes and are not intended to limit the scope of the embodiments. It is to be understood that any combination or configuration of any of the foregoing is to be considered as being within the scope of this disclosure, as will be apparent to one skilled in the art.

According to embodiments, individual ones of the constituent turbine modules 100 in array 400 may be easily removed and replaced by the end-user in the event of wear or damage without impacting the functioning or output of remaining ones of the array 400 as a whole.

According to certain embodiments, one or more dummy housing tubes 402 may be installed at one end (e.g., the bottom) of each row as illustrated in FIG. 4. According to an embodiment, dummy housing tubes 402 may be configured as complete, non-vented (no cutouts 107), empty sections of tubing with the same dimensions and mounting features 114 as included with the turbine modules 100 and may serve to direct air into the lower half of the turbine module(s) above the dummy housing tubes 402 and/or to raise the functional array 400 off the ground while maintaining a constant form and appearance. The dummy housing tube(s) 402 may also serve as a housing for additional power conversion, conditioning and/or monitoring equipment as needed to service the array 400 of turbine modules. According to an embodiment, dummy housing tubes 402 may also have geometric features such as a partially "C-shaped" cross section that may serve to increase wind flow to the turbines above or below it.

According to embodiments, individual rotors 104 housed within turbine modules 100 that collectively form the array 400, may be configured or allowed to rotate independently of one another in random phase, at varying angular velocities and even in opposite rotational direction with respect to each other. This presents several advantages. Firstly, it enables the array 400 to more efficiently capture energy from turbulent (non-laminar) and inconsistent fluid flow patterns, as is typical of wind near the ground and structures for example. Secondly, it allows array 400 to produce more constant DC power output, according to embodiments, as summing many rectified AC waveforms of random phase and varying frequency tends to cancel amplitude and phase differences (according to the law of large numbers), resulting in a smoother aggregate DC waveform with fewer losses. Thirdly, the same principle applies to any cyclic noise that is generated, as the various sound waveforms generated are also of random phase and varying frequency, and thus amplitude variations tend to cancel with increasing number of varying waveforms, resulting in "white noise", according to embodiments.

Figure 5:
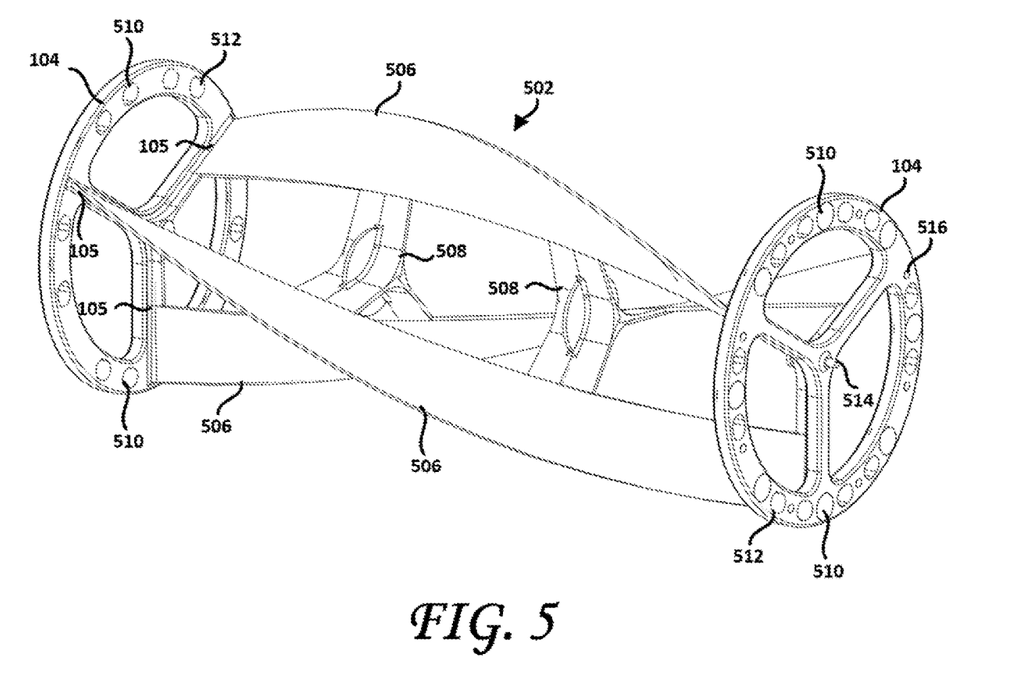
FIG. 5 is a perspective view of a rotor assembly of a power generation module device according to one embodiment.

FIG. 5 shows internal components of a tube-shaped turbine module 100, according to one embodiment. As shown, the turbine module 100 may include a turbine assembly 502 and one or more rotors 104. According to the embodiment shown, turbine assembly 502 may comprise one or more blades 506 spanning the distance between the generator rotors 104 while twisting. The ends of each of the blades 506 is fixedly attached to (or indeed forms a homogeneous part of the structure of) the rotors 104 and internal struts 508 may be provided, according to one embodiment, to add further rigidity to the blades 506 and to the turbine assembly 502. Rotors 104 also include permanent magnets 510 and may include lightening holes 512. However, it is to be understood that the illustration shown is but exemplary for purposes of discussion herein and is not intended as limiting the scope of the embodiments shown and described herein. Notably, embodiments comprise variations on the geometry of turbines according to other airfoil and hydrofoil geometries, including those of horizontal-axis (HAWT) and vertical-axis (VAWT) forms and drag and/or lift varieties, including Savonius-type and Darrieus-type airfoil geometries, and with an arbitrary number of blades 506. According to the embodiment shown, turbine assembly 502 is bidirectional in nature, allowing the blades 506 to rotate in either direction (following the direction of fluid flow), without a mechanical preference for one direction over the other. Moreover, turbine blades 506 may exhibit a helical geometry, to minimize torque oscillation/ripple as well as to enable turbine assembly 502 to capture kinetic energy from fluid flowing radially as well as axially, according to the embodiment shown.

According to certain embodiments, the design of the turbine assembly 502, shown in FIG. 5 without a central shaft along its rotational axis, offers the advantages of eliminating any shadowing caused by such a central shaft (preventing such a shaft from slowing fluid flow without generating power), by eliminating the weight, inertia and complexity of such a central shaft, and by allowing fluid that flows past the blade 506 closest to the inbound fluid to drive the aft blades 506. Nonetheless, other embodiments may comprise one or more driven shafts that may run the length of the turbine axis or may be truncated similar to stub axles 514 shown. Additionally, because turbine assembly 502 is supported only at its ends, according to one embodiment, it does not suffer from shadowing caused by radial support struts or a single large pole, as in typical HAWT designs, or outer support struts running parallel to the axis of rotation, as in typical VAWT designs.

Balancing pilots 516 may assist in removing material during assembly to precisely balance each individual turbine assembly about its rotational axis. According to embodiments, the small scale, low rotational inertia and precisely-balanced nature of the turbine assembly 502 assists the rotation of the blades 506, and the generation of electric power, at very low fluid velocities (low cut-in speed) and to easily vary its rotational speed and direction, while minimizing friction, heat and sound. Its small scale and low inertia also improve safety by allowing the blades 506 to safely stop rotating easily in the event that something comes into contact therewith.

According to an embodiment, the turbine assembly 502 and/or bearings 610 (FIG. 6B) may be easily removed and replaced by the end-user in the event of wear or damage, without replacing the entire turbine module 100. According to one embodiment, this is made possible by the removal of stub axles 514 and subsequent removal of turbine assembly 502 and bearings radially through the cutouts 107 of housing tube 102. According to another embodiment, the stators 106 themselves may be configured to be removable, allowing turbine assembly 502 and other contents to be removed from housing tube longitudinally.

According to another embodiment, permanent magnets 510 may be replaced by electromagnets, for example wire coils or thin film-based devices. The turbine assembly 502 of FIG. 5 may comprise a single, homogeneous part (apart from permanent magnets 510) that may be made of or comprise inexpensive, injection-molded plastic or other suitable rigid, strong and lightweight material, according to embodiments. Additive printing techniques may also be used to print the turbine assembly 502 and/or the housing tube 102. It is to be understood that any combination or configuration of any of the foregoing is to be considered as being within the scope of this disclosure, as will be apparent to one skilled in the art.

The turbine assembly 502 shown in FIG. 5 may be of most any arbitrary dimensions. For example, the turbine assembly 502 may range from 2 to 36 inches in diameter and 3 to 36 inches in length. It is to be understood, however, that the foregoing dimensions and any dimensions referred to herein are exemplary in nature only. Those of skill in this art will recognize that other dimensions and/or configurations may be implemented, depending upon the application, and that the elements of the device and system could be of any length or dimension, all of which are considered within the scope of this disclosure.

Figure 6A:
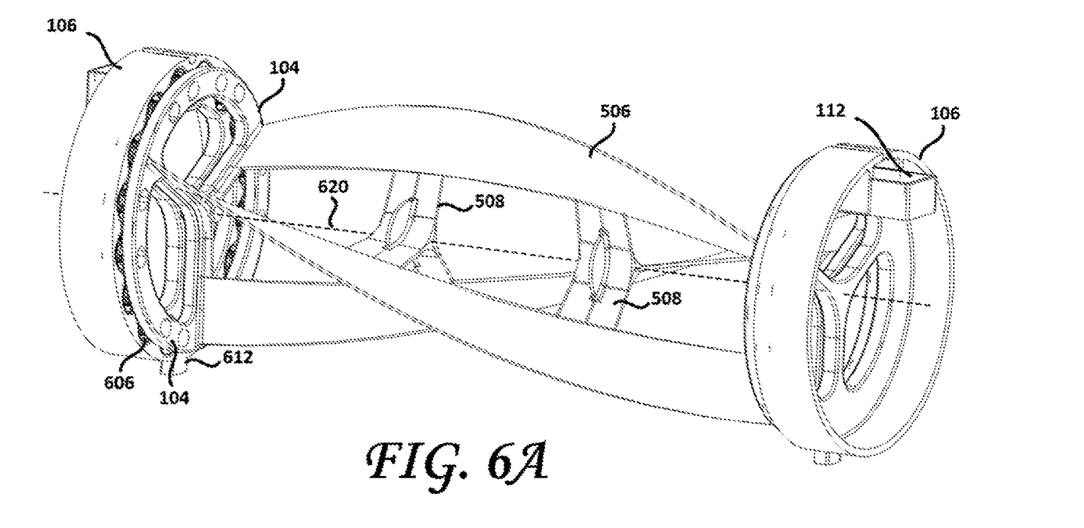
FIG. 6A is a perspective view of a complete power generation assembly of a power generation module device according to one embodiment, showing the rotating blades, rotors and stators.
Figure 6B:
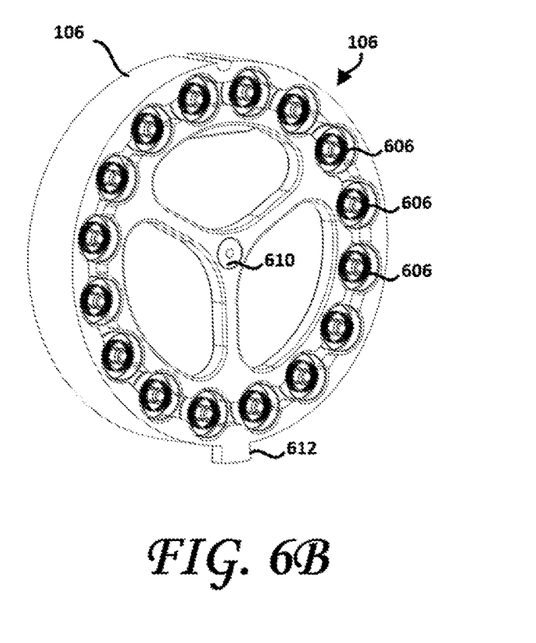
FIG. 6B is a first view of a stator of a power generation module device according to one embodiment.
Figure 6C:
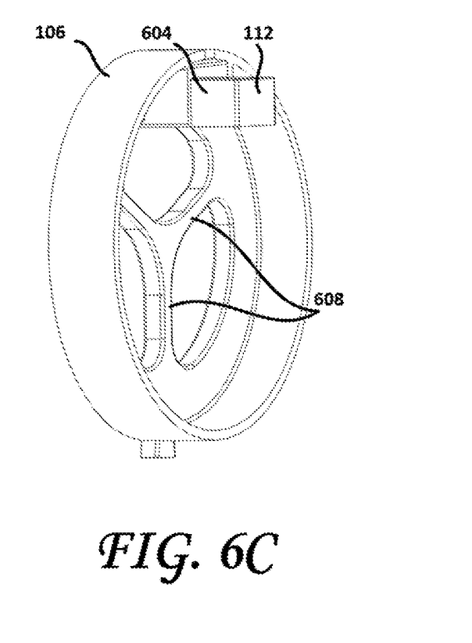
FIG. 6C is a second view of a stator of a power generation module device according to one embodiment.

FIG. 6A shows the turbine assembly 502 and a pair of non-rotating stator/bearing supports 106, junction box(es) 112, AC to DC rectifier(s) 604, wire coils 606, struts 508, bearings 610, and alignment key(s) 612, according to one embodiment. The illustration shown is conceptual in nature for purposes of discussion herein and is not intended as limiting the scope of the embodiments shown and described herein.

As permanent magnets 510 of rotors 104 move relative to stationary wire coils 606 of stators 106, a voltage is induced across the circuit that includes wire coils 606, generating electric power. Faraday's law states that this induced voltage is proportional to the change of magnetic flux in the coils. Practically speaking, this means that the voltage induced is a linear function of the velocity at which the magnets 510 move past the wire coils 606, the number of magnets 510 and wire coils 606, the amount of wire in each coil, the number of wire turns in each coil, the strength of the magnets 510 and the distance between the magnets 510 and wire coils 606 (which distance is minimized). The power generated is, in turn, a function of the square of the voltage induced. The velocity at which the magnets 510 move past the wire coils 606 is a function of the generator shaft's angular velocity (measured in revolutions per minute (RPM), for example) multiplied by the rotor hub diameter, sometimes referred to as rim speed. Typical electric generators must spin at high RPM, an order of magnitude greater than the RPM of typical fluid turbines, to efficiently produce electric power. Therefore, large turbines typically incorporate significant gear reductions (to spin the generator at much higher RPM than the turbine) along with large diameter rotor hubs. However, this remains a challenge for small wind turbines, which are left with the choice of using large, expensive "direct-drive" generators (with a greater number of coils and much larger magnets) as is typically done, using expensive, complex, noisy and higher-maintenance gearboxes, or producing poor power output.

Embodiments disclosed herein address this challenge geometrically by making the circle defined by the electromagnetic interactions (effectively the diameter of the rotor 104) at least as large or larger than the diameter circumscribed by the rotating blades 506, the two diameters being inverted with respect to conventional turbine designs, according to one embodiment. Effectively, this means that the diameter of the rotors 104 is larger than a diameter of the volume of revolution circumscribed by the plurality of curved blades in rotation. This results in a much greater relative rim speed without employing gears. Both diameters remain relatively small; however, smaller turbines rotate at proportionally higher RPM/lower torque (at a given linear fluid velocity), and so the effect of overall rotor/turbine diameter cancels, leaving the ratio of the turbine and rotor hub diameters as the significant parameter.

Wire coils 606 may be wound or conductive traces laid down, in any configuration and geometry, according to embodiments. According to additional embodiments, wire coils 606 may be replaced with other electromagnetic induction devices, such as thin film inductors. A homopolar generator design may also be used, or wire coils may be of a certain geometry and configuration that naturally produces DC (or pseudo-DC) power without the need for rectification. According to yet further embodiments, rotor 104, magnets 510, stator 106 and wire coils 606 may be eliminated in favor of connecting the turbine directly to a standard electric generator, such as to an "off-the-shelf" electric generator which may include an integrated gearbox. In any case, a separate set of gears (for example, in a planetary gear arrangement) may also be incorporated.

Bearing(s) 610 may be of any variety that is easily envisioned by those of skill in this art, such as ball bearings or journal bearings, and may be made of or comprise stainless steel, PTFE, and/or any other suitably strong, low-friction, wear-resistant and corrosion-resistant material. According to some embodiments, stator/bearing support 106 may comprise a single, homogeneous part (apart from rectifier 604, wire coils 606 and bearing 610) that may be made of or comprise inexpensive, injection-molded plastic or other suitable rigid, strong and light-weight material. According to other embodiments, stator/bearing support 106 may be built-up from multiple discrete components and/or printed in an additive printing process. The simple, brushless and gearless design of embodiments shown and described herein may constitute a long-life, near maintenance-free and near-silent design. It is to be understood that any combination or configuration of any of the foregoing is to be considered as being within the scope of this disclosure, as will be apparent to one skilled in the art.

One embodiment, therefore, is an electrical energy generation device, that may comprise a one-piece turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation; a plurality of magnets disposed within each of the first and second rotors; a first stator co-axially disposed relative to the first rotor and a second stator co-axially disposed relative to the second rotor; a plurality of conductive wire coils disposed within each of the first and second stators; and a housing tube cover extending at least from the first stator to the second stator and covering the first and second rotors and the first and second stators, the housing tube cover comprising a cutout configured to expose a portion of the plurality of curved blades, such that fluid mass flow impinging upon the exposed portion of the plurality of blades causes the curved blades to rotate and electrical energy to be induced in the plurality of conductive wire coils.

The electrical energy generation device may further comprise one or more support struts such as shown at 508 in FIG. 5, centered on the axis of rotation, each support strut being coupled to each of the plurality of curved blades 506. As best shown in FIG. 5, the one-piece turbine assembly 502 is free from (i.e., does not have) any central shaft disposed along the axis of rotation. Stated differently, the one-piece turbine circumscribes empty space along the axis of rotation, except where the support strut(s) 508 cross the axis of rotation, if such support strut(s) are present. In one embodiment, the diameter of the first and second rotors 104 is larger than a diameter of a volume of revolution circumscribed by the plurality of curved blades 506. The first and second stators, in one embodiment, each may be formed of or into a single piece of material. The plurality of curved blades are configured to freely rotate clockwise or counterclockwise. The cutout 107 of the housing tube 102, according to one embodiment, may be configured such that a longest direction thereof is parallel to the axis of rotation. Each of the first and second rotors 104 may comprise blade attachment features (see reference 105 in FIG. 5) or locations disposed around the rotors 104 at 0, 120 and 240 degree positions, respectively, and wherein the plurality of curved blades 506 may comprise first to third curved blades attached to the blade attachment features 105 of the first rotor at 0 degrees, 120 degrees and 240 degrees, respectively, and wherein the first to third curved blades are attached to the blade attachment features 105 of the second rotor at 120 degrees, 240 degrees and 0 degrees, respectively. This forms the twist shown by the blades 506 in, for example, FIG. 6A. The number of blades 506 will change the spacing and angular offsets of the attachment features around the rotors 104, as those of skill will recognize.

Another embodiment comprises an array of electrical energy generation devices, configured as shown in FIG. 4 at 400 or arranged in another configuration. Such an array, according to one embodiment, may comprise a plurality of electrical energy generation devices disposed adjacent to one another. According to one embodiment, each of the plurality of electrical energy generation devices may comprise a one-piece turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation; a plurality of magnets disposed within each of the first and second rotors; a first stator co-axially disposed relative to the first rotor and a second stator co-axially disposed relative to the second rotor; a plurality of conductive wire coils disposed within each of the first and second stators; and a housing tube cover extending at least from the first stator to the second stator and covering the first and second rotors and the first and second stators. In one embodiment, the housing tube cover may comprise a cutout configured to expose a portion of the plurality of curved blades, such that fluid mass flow impinging upon the exposed portion of the plurality of blades causes the curved blades to rotate and electrical energy to be induced in the plurality of conductive wire coils.

The array may further comprise one or more dummy housing tubes, such as shown at 402 in FIG. 4, disposed at one end of the array 400, the dummy housing tube(s) being identical to each of the housing tubes of each of the plurality of the constituent electrical energy generation devices of the array, but for a presence of the cutout(s) 107. According to one embodiment, each of the plurality of electrical energy generation devices may be configured to independently rotate clockwise or counterclockwise, and to do so in or out of phase relative to other ones of the plurality of electrical energy generation devices. AC electrical energy is induced in each of the plurality of conductive wire coils, and each of the plurality of electrical energy generation devices further may comprise an AC to DC converter. In this manner, the converted DC electrical energy output contribution of each of the plurality of electrical energy generation devices may be summed and/or otherwise processed or conditioned as the output of the array of electrical energy generation devices. An electrical load may be coupled to the array, such as storage batteries, fed back to the electrical grid, used for heating, powering a prime mover or used for some other purpose.

Another embodiment is a method of generating electrical energy, comprising providing a plurality of electrical energy generation devices disposed adjacent to one another in an array. Each of the plurality of electrical energy generation devices may comprise a one-piece turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation; a plurality of magnets disposed within each of the first and second rotors; a first stator co-axially disposed relative to the first rotor and a second stator co-axially disposed relative to the second rotor; a plurality of conductive wire coils disposed within each of the first and second stators; and a housing tube cover extending at least from the first stator to the second stator and covering the first and second rotors and the first and second stators, the housing tube cover comprising a cutout configured to expose a portion of the plurality of curved blades. The method may further comprise exposing a portion of the plurality of curved blades to fluid mass flow (wind, for example) through the cutout; and inducing electrical energy in the plurality of conductive wire coils as the fluid mass flow causes the curved blades to rotate about the axis of rotation and the plurality of magnets in the first and second rotors rotate past the plurality of conductive wire coils in the first and second stators.

According to one embodiment, the method may further comprise providing, in each of the plurality of electrical energy generation devices, one or more support struts, shown at 508 in FIG. 5, centered on the axis of rotation, each support strut being coupled to each of the plurality of curved blades. The one-piece turbine assembly may be free from any central shaft disposed along the axis of rotation. That is, the one-piece turbine may comprise empty space along the axis of rotation, except where the support struts 508 crosses the axis of rotation. In another embodiment, the inherent rigidity of the curved blades 506 and of the rotors 104 obviate the need for the support struts 508, thereby further reducing obstructions to the free flow of wind or other mass fluid through the turbine modules 100.

In one embodiment, the diameter of the first and second rotors may be at least as large as the diameter of a volume of revolution circumscribed by the plurality of curved blades as they rotate. In each of the plurality of electrical energy generation devices, the first and second rotors 104 may be each formed of or from a single piece of material and/or may be formed via additive printing techniques to form a single piece of sintered rotor-shaped material. The same may be said for the stators 106, which may also be formed of or from a single piece of material and/or may be formed via additive printing techniques to form a single piece of sintered stator-shaped material. In each of the plurality of electrical energy generation devices, the cutout 107 of the housing tube 102 may be configured such that a longest direction (shown in FIG. 3 as the span referenced by numeral 107) thereof is parallel to the axis of rotation, shown at 620 in FIG. 6A. In each of the plurality of electrical generation devices, each of the first and second rotors 104 may comprise blade attachment features, points or locations 105 (FIG. 5) at 0, 120 and 240-degree positions, respectively. The plurality of curved blades 506 may comprise first to third curved blades attached to the blade attachment features 105 of the first rotor at 0 degrees, 120 degrees and 240 degrees, respectively, and wherein the first to third curved blades are attached to the blade attachment features of the second rotor at 120 degrees, 240 degrees and 0 degrees, respectively. The plurality of curved blades 506 of each of the plurality of electrical energy generation devices may be configured to independently rotate clockwise or counterclockwise, in or out of phase with the curved blades 506 of other ones of the plurality of electrical energy generation devices. In one embodiment, AC electrical energy may be induced in each of the plurality of conductive wire coils (or conductive traces) of each of the plurality of electrical energy generation devices and the method further may comprise converting the induced AC electrical energy to DC electrical energy in each of the electrical energy generation devices; and summing a converted DC electrical energy output contribution of each of the plurality of electrical energy generation devices to generate an output of the array of electrical energy generation devices.

Lastly, while certain embodiments of the disclosure have been described, these embodiments have been presented by way of example only and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all the features and advantages set forth herein, are also within the scope of this disclosure. Accordingly, the scope of the present disclosure is intended to be defined only by reference to the appended claims.

What is claimed is:

1. An electrical energy generation device, comprising:
   a turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation;
   a plurality of magnets disposed within each of the first and second rotors;
   a first stator support co-axially disposed relative to the first rotor and a second stator support co-axially disposed relative to the second rotor;
   a plurality of conductive wire coils disposed within each of the first and second stator supports; and
   a one-piece housing tube cover extending at least from the first stator support to the second stator support and encircling the first and second rotors and the first and second stator supports but for at least one cutout that is parallel to the axis of rotation and that is configured to expose a portion of the plurality of curved blades on only one side of the axis of rotation such that fluid mass flow impinging upon the exposed portion of the plurality of blades through the cutout causes the curved blades to rotate and electrical energy to be induced in the plurality of conductive wire coils.

2. The electrical energy generation device of claim 1, further comprising at least one support strut centered on the axis of rotation, each support strut being coupled to each of the plurality of curved blades.

3. The electrical energy generation device of claim 2, wherein the turbine assembly is free from any central shaft disposed along the axis of rotation.

4. The electrical energy generation device of claim 2, wherein the turbine circumscribes empty space along the axis of rotation, except where the at least one support strut crosses the axis of rotation.

5. The electrical energy generation device of claim 1, wherein the diameter of the first and second rotors is larger than a diameter of a volume of revolution circumscribed by the plurality of curved blades.

6. The electrical energy generation device of claim 1, wherein the first and second stator supports are each formed of a single piece of material.

7. The electrical energy generation device of claim 1, wherein the plurality of curved blades is configured to freely rotate clockwise or counterclockwise.

8. The electrical energy generation device of claim 1, wherein the cutout of the housing tube is configured such that a longest direction thereof is parallel to the axis of rotation.

9. The electrical energy generation device of claim 1, wherein each of the first and second rotors comprise blade attachment features at 0, 120 and 240 degree positions, respectively, and wherein the plurality of curved blades comprise first to third curved blades attached to the blade attachment features of the first rotor at 0 degrees, 120 degrees and 240 degrees, respectively, and wherein the first to third curved blades are attached to the blade attachment features of the second rotor at 120 degrees, 240 degrees and 0 degrees, respectively.

10. An array of electrical energy generation devices, comprising:

a plurality of electrical energy generation devices disposed adjacent to and above and below one another, each of the plurality of electrical energy generation devices comprising:
a turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation;
a plurality of magnets disposed within each of the first and second rotors;
a first stator support co-axially disposed relative to the first rotor and a second stator support co-axially disposed relative to the second rotor;
a plurality of conductive wire coils disposed within each of the first and second stator supports; and
a one-piece housing tube cover extending at least from the first stator support to the second stator support and encircling the first and second rotors and the first and second stator supports but for at least one cutout that is parallel to the axis of rotation and that is configured to expose a portion of the plurality of curved blades on only one side of the axis of rotation such that fluid mass flow impinging upon the exposed portion of the plurality of blades through the cutout causes the curved blades to rotate and electrical energy to be induced in the plurality of conductive wire coils.

11. The array of electrical energy generation devices of claim 10, further comprising:
a dummy housing tube disposed at a bottom of each row of the array, the dummy housing tube being identical to each of the housing tubes of each of the plurality of the constituent electrical energy generation devices of the array, but for a presence of the cutout.

12. The array of electrical energy generation devices of claim 10, wherein each of the plurality of electrical energy generation devices is configured to independently rotate clockwise or counterclockwise, in or out of phase with other ones of the plurality of electrical energy generation devices.

13. The array of electrical energy generation devices of claim 10, wherein AC electrical energy is induced in each of the plurality of conductive wire coils and wherein each of the plurality of electrical energy generation devices further comprises an AC to DC converter and wherein a converted DC electrical energy output contribution of each of the plurality of electrical energy generation devices is summed as the output of the array of electrical energy generation devices.

14. A method of generating electrical energy, comprising:
providing a plurality of electrical energy generation devices disposed adjacent to and above and below one another in an array, each of the plurality of electrical energy generation devices comprising:
a turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation; a plurality of magnets disposed within each of the first and second rotors; a first stator support co-axially disposed relative to the first rotor and a second stator support co-axially disposed relative to the second rotor; a plurality of conductive wire coils disposed within each of the first and second stator supports; and a one-piece housing tube cover extending at least from the first stator support to the second stator support and encircling the first and second rotors and the first and second stator supports but for at least one cutout that is parallel to the axis of rotation and that is configured to expose a portion of the plurality of curved blades through the cutout; and
exposing a portion of the plurality of curved blades to fluid mass flow through the cutout; and
inducing electrical energy in the plurality of conductive wire coils as the fluid mass flowing through the at least one cutout causes the curved blades to rotate about the axis of rotation and the plurality of magnets in the first and second rotors rotate past the plurality of conductive wire coils in the first and second stator supports.

15. The method of claim 14, further comprising providing, in each of the plurality of electrical energy generation devices, at least one support strut centered on the axis of rotation, each support strut being coupled to each of the plurality of curved blades.

16. The method of claim 15, wherein the turbine comprises empty space along the axis of rotation, except where the at least one support strut crosses the axis of rotation.

17. The method of claim 14, wherein the turbine assembly is free from any central shaft disposed along the axis of rotation.

18. The method of claim 14, wherein the diameter of the first and second rotors is larger than a diameter of a volume of revolution circumscribed by the plurality of curved blades as they rotate.

19. The method of claim 14 wherein, in each of the plurality of electrical energy generation devices, the first and second stator supports are each formed of a single piece of material.

20. The method of claim 14, wherein, in each of the plurality of electrical energy generation devices, the cutout of the housing tube is configured such that a longest direction thereof is parallel to the axis of rotation.

21. The method of claim 14, wherein, in each of the plurality of electrical generation devices, each of the first and second rotors comprise blade attachment features at 0, 120 and 240 degree positions, respectively, and wherein the plurality of curved blades comprise first to third curved blades attached to the blade attachment features of the first rotor at 0 degrees, 120 degrees and 240 degrees, respectively, and wherein the first to third curved blades are attached to the blade attachment features of the second rotor at 120 degrees, 240 degrees and 0 degrees, respectively.

22. The method of claim 14, wherein the plurality of curved blades of each of the plurality of electrical energy generation devices is configured to independently rotate clockwise or counterclockwise, in or out of phase with the curved blades of other ones of the plurality of electrical energy generation devices.

23. The method of claim 14, wherein AC electrical energy is induced in each of the plurality of conductive wire coils of each of the plurality of electrical energy generation devices and wherein the method further comprises:
converting the induced AC electrical energy to DC electrical energy in each of the electrical energy generation devices; and
summing a converted DC electrical energy output contribution of each of the plurality of electrical energy generation devices to generate an output of the array of electrical energy generation devices.

24. An electrical energy generation device, comprising:
a turbine assembly comprising a first rotor, a second rotor disposed a distance away from the first rotor along an axis of rotation and a plurality of curved, ribbon-shaped blades spanning the distance between the first and second rotors and solely supporting the first and second rotors in rotation about the axis of rotation, ends of each of the plurality of blades being attached to the first rotor in respectively different first radial orientations and to the second rotor in respectively different radial second orientations that are each angularly offset relative to the first orientations so as to impart a helical twist on each of the plurality of ribbon-shapes blades;

a plurality of magnets disposed within each of the first and second rotors;

a first stator support co-axially disposed relative to the first rotor and a second stator support co-axially disposed relative to the second rotor;

a plurality of conductive wire coils disposed within each of the first and second stator supports; and a one-piece housing tube cover extending at least from the first stator support to the second stator support and encircling the first and second rotors and the first and second stator supports but for at least one cutout configured to expose a portion of the plurality of curved blades on only one side of the axis of rotation such that fluid mass flow impinging upon the exposed portion of the plurality of blades through the cutout causes the curved blades to rotate and electrical energy to be induced in the plurality of conductive wire coils.

25. An electrical energy generation device, comprising:

a turbine assembly comprising a first rotor, a second rotor disposed a distance away from the first rotor along an axis of rotation and a plurality of curved blades spanning the distance between the first and second rotors and solely supporting the first and second rotors in rotation about the axis of rotation such that the turbine assembly is free from any central shaft disposed along the axis of rotation;

a plurality of magnets disposed within each of the first and second rotors;

a first stator support co-axially disposed relative to the first rotor and a second stator support co-axially disposed relative to the second rotor;

a plurality of conductive wire coils disposed within each of the first and second stator supports; and a one-piece housing tube cover extending at least from the first stator support to the second stator support and encircling the first and second rotors and the first and second stator supports but for at least one cutout configured to expose a portion of the plurality of curved blades on only one side of the axis of rotation such that fluid mass flow impinging upon the exposed portion of the plurality of blades through the cutout causes the curved blades to rotate and electrical energy to be induced in the plurality of conductive wire coils.

* * * * *